United States Patent [19]

Bondy

[11] 4,381,844
[45] May 3, 1983

[54] LID SEAL FOR NUCLEAR WASTE CONTAINERS

[76] Inventor: Ferdinand H. Bondy, 1916 S. Washington St., Tacoma, Wash. 98405

[21] Appl. No.: 290,842

[22] Filed: Aug. 7, 1981

[51] Int. Cl.³ .............................................. B65D 53/00
[52] U.S. Cl. .................................................... 220/378
[58] Field of Search .......................................... 220/378

[56] References Cited

U.S. PATENT DOCUMENTS 3,230,290 1/1966 Nelson et al. ................... 220/378 X
3,269,585 8/1966 Christensen ......................... 220/378
3,406,863 10/1968 Wenzel et al. .................. 220/378 X
3,481,503 12/1969 Kloess et al. .................... 220/378 X

*Primary Examiner*—George T. Hall
*Attorney, Agent, or Firm*—Ford E. Smith; David L. Garrison

[57] ABSTRACT

A folded gasket formed of a length of flexible fabric-like material is disclosed as being disposed between juxtaposed surfaces at the juncture of the lid periphery to a container mouth to adapt the container to withstand the rigors of transport, storage and burial as in the case of the nuclear waste material and the like.

7 Claims, 2 Drawing Figures

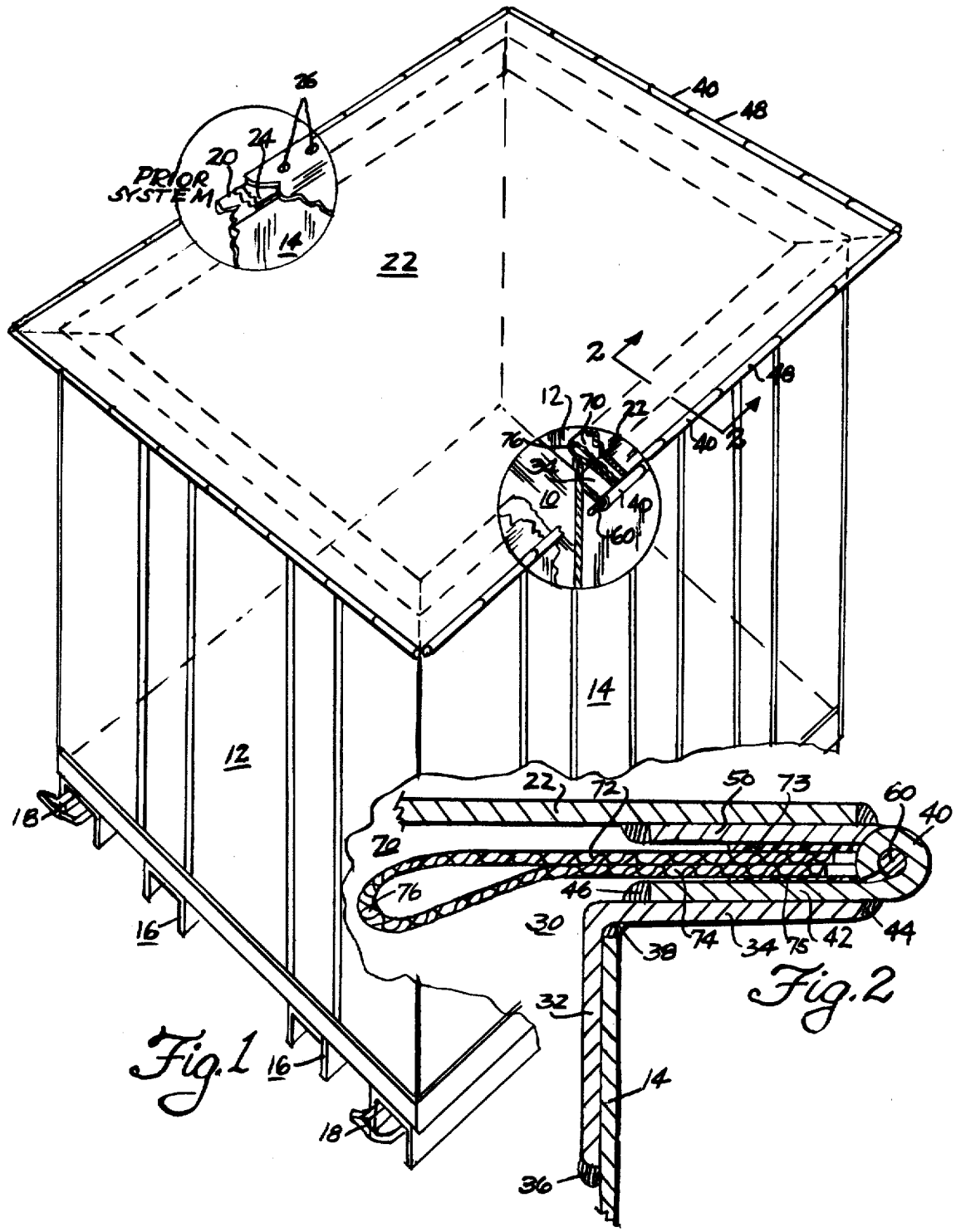

LID SEAL FOR NUCLEAR WASTE CONTAINERS

BACKGROUND OF THE INVENTION

The transport, storage and burial (usually underground) of nuclear waste material, for example, is accompained by very rigorous application of forces and loads. Typically such containers in the right rectangular form are usually about 7 feet long by 6 feet wide and 6 feet deep. They are generally adapted to be engaged and moved by fork-lift trucks and also by hoisting slings for being raised and moved from one location to another, or from the ground to a transport vehicle. Such handling operations are usually conducted quickly and roughly and subject the containers to substantial and often damaging forces. One of the zones of concern over the continued intensity of the container is sealing juncture between the lid and the opening mouth of the container. Some prior practices have been deemed objectionable because of the length of time required to manually effect the lid to container seal resulting in overlong exposure of the workman to, in the case of nuclear waste disposal, protracted hazards due to nuclear radiation. Another concern is felt about the integrity of the lid to contain punctures per se. Governmental standards have been promulgated by the Department of Transport (DOT) requirements for "Type A Packaging" as more fully appear in the Code of Federal Regulations (CFR) Title 49 Transportation, para. 178.350 Specification 7A and CFR 173.398(b) Specifications for General Packaging.

In meeting such standards raised 9800 pound containers filled with sand must be tested by being dropped a distance of four feet in such a manner as to place severe strains on the joint at the lid and container periphery. Even though the prior art joint is gasketed by a marginal peripheral gasket strip often the fastener pull out and the joints are liable to open to permit enclosed sand to escape. This would be clearly undesireable.

SUMMARY OF THE INVENTION

This patent discloses a metallic container of right rectangular conformation adapted to withstand the rigors of filling, storage, transport and burial of waste material such as nuclear waste of a wide variety of kinds. Obviously as will become apparent, the invention herein is not necessarily restricted to right rectangular containers since its application to right cylindrical containers is clearly possible. The container mouth is provided with a horizontal surface around its margin with which the periphery of the lid cooperatively mates in juxtaposition. Between these mating surfaces is mounted a length of fabric-like, flexible, interiorly folded material that functions as an expansible peripheral gasket. Adjacent edges of said mating surfaces are immovably secured together by aligned, interfitted, hinge-like sleeves or tubular members alternately secured to the lid and container at adjacent edges. An elongated rod or keying member is threaded through the tubular sleeves to lock them in alignment. It will be seen therefore that this patent has as primary objectives; the provision of a lid-to-container joint having substantial rigor withstanding characteristics; and, further, the provision of a lid-to-container joint having a flexiable and expansible gasket capable of maintaining the container sealed despite malformation of the physical joint between a container at its mouth and an overlying lid. That these main, but by no means all, objectives have been accomodated will become apparent from the following specification and discussion.

PRIOR ART STATEMENT

The only prior system developed in late 1980 so far as this inventor knows for sealing lidded right rectangular nuclear waste disposal containers is shown schematically in the drawings attached hereto and disclosed in the attached drawing of Part No. 0720-0720-0840-0188 of the Capital Industries, Seattle, Wash. 3/16 PL Container in which the shipping weight is stated to be 2,370 pounds and which shows a previous system not considered prior art and which does not make the instant invention obvious.

DESCRIPTION OF THE DRAWINGS

FIG. 1 is a perspective view of a typical waste disposal container incorporating the novel lid-to-container joint herein and also by an insert sketch showing the pertinent known prior art; and FIG. 2 is a cross-section much enlarged in the plane of line 2—2 of FIG. 1.

DETAILED DESCRIPTION OF THE INVENTION

The container of FIG. 2 comprises a bottom 10, opposed end walls 12,12, and opposed side walls 14, 14 joined to form a right rectangular space-enclosing object having an upwardly open mouth to receive material and be closed.

Typically end walls 12 will be 6'×6'; sidewalls 6'×7'; and the bottom 10 6'×7'. Such a container is constructed out of sheet metal, usually steel with continuous welds at corners where wall and bottom panels meet. Stringers 16 raise the bottom to permit entry of the lifting arms of a fork-lift truck. Lifting loops are designated 18,18 for the attachment of hoisting slings.

The prior system illustrated and shown in the far side of FIG. 1 discloses that between the marginal wall flange 20 and superposed periphery of lid 22 is a strip gasket 24. Closely spaced sheet-metal screws 26,26 joins the lid 22 to flange 20. The securement of lid 22 by such screw means 26 can require the services of a couple of workmen for an excessively long time thus risking overlong exposure, in the case of nuclear waste disposal, to nuclear radiation very likely to be harmful to the workmen. This prior system is also shown in the accompanying print of a drawing for Part No. 0720.

Referring to the details shown in FIG. 2, the top of walls 12 and 14 are surmounted by a flanged collar 30 having a leg 32 and the outward extending flange 34. Leg 32 is welded at 36 and 38. Lid 22 is dimensioned to cover the mouth of the container and to overlie the marginal flange 34. The peripheral of the lid 22 and the surrounding flanges 34 are secured together by hinge-like structure comprising interfitted and aligned sleeves 40 having arms 42 welded at 44 and 46 to flange 34. Like sleeves 48 have arms 50 welded at 52 and 54 to the margin of lid 22. An elongated rod 60 is inserted through the two aligned and interfitted sleeves 40 and 48 at each edge of lid 22 to secure the lid closed to the container peripheral flange 34 to complete the lid-to-flange joint construction. Rod 60 at its ends may be upset or swaged or tack-welded to preclude voluntary or involuntary withdrawal.

The flexible fabric-like gasket 70 comprises two juxtaposed strips 72 and 74 placed between arms 42 and 50 of hinge-like joint as best seen in FIG. 2 where they are attached or secured against displacement by adhesive strips 73 and 75 respectively. The gasket strips 72, 74 are integrally joined by internal fold 76 which is expansible upon arms 72 and 74 being separated from their normal juxtaposition as could occur when the closed container is racked, corner stressed, overloaded or otherwise subjected to extraordinary forces.

The gasket 70 can be made of any of several materials from Neoprene to glass or ceramic fiber materials. They should be attached in place with a heat-resisting adhesive that meets the 1475° F. requirement for 10 minutes for the type B containers which are strenuously tested by being dropped 30 feet and are usually used for containing high-level nuclear waste.

What is claimed is:

1. In a metallic container for withstanding the rigors of transport, storage and burial of nuclear waste material, for example, a lid-to-top edge joint construction, comprising:
    means providing a horizontal surface around the upper edge of said container;
    a lid having a planar surface substantially coextensive with said horizontal surface and disposed thereover;
    a folded strip of flexible gasketing material interposed between said surfaces and having the fold thereof within said container; and
    means securing the periphery of said lid to said container.

2. In the container construction of claim 1 in which edges of said gasketing material opposite said fold are adhesively attached one to said horizontal surface and one to said lid planar surface.

3. The container construction of claim 1 in which the peripheral securing means comprise along each edge interfitted, aligned sleeves having a rod-like member inserted therethrough.

4. The container construction of claim 1 in which the horizontal surface around the upper edge of said container extends outward of the sides of the container.

5. The construction of claim 2 in which said folded gasketing material comprises a water impregnable fabric of a width of such that the fold thereof extends within the confines of said container.

6. The container construction of claim 3 in which said rod-like members are immovably secured in place.

7. A container to withstand the rigors of transport, storage and burial of nuclear waste material, comprising:
    a plurality of metallic walls and a metallic bottom assembled to form a right rectangular receptacle;
    means peripheral of the upper edge of said receptacle providing an unbroken generally horizontal surface;
    a lid having a peripheral planar surface coextensive with and superposed relative said horizontal surface;
    a folded strip of water impregnable fabric gasketing material having its edges disposed between said surfaces and the fold thereof inward of said generally horizontal surface;
    adhesive means between the outer surfaces of said edges and the adjacent superposed surfaces; and
    means securing the periphery of said lid to said container.

* * * * *